US010142266B2

(12) United States Patent
Liu et al.

(10) Patent No.: US 10,142,266 B2
(45) Date of Patent: Nov. 27, 2018

(54) METHOD AND SYSTEM FOR PROVIDING RECOMMENDATIONS DURING A CHAT SESSION

(71) Applicant: Tencent Technology (Shenzhen) Company Limited, Shenzhen (CN)

(72) Inventors: Yelu Liu, Shenzhen (CN); Changlin Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 232 days.

(21) Appl. No.: 15/186,132

(22) Filed: Jun. 17, 2016

(65) Prior Publication Data

US 2016/0301639 A1 Oct. 13, 2016

Related U.S. Application Data

(63) Continuation of application No. PCT/CN2015/070151, filed on Jan. 6, 2015.

(30) Foreign Application Priority Data

Jan. 20, 2014 (CN) .......................... 2014 1 0025044

(51) Int. Cl.
*G06F 15/16* (2006.01)
*H04L 12/58* (2006.01)
(Continued)

(52) U.S. Cl.
CPC ...... *H04L 51/046* (2013.01); *G06F 17/30864* (2013.01); *G06Q 10/107* (2013.01);
(Continued)

(58) Field of Classification Search
None
See application file for complete search history.

(56) References Cited

U.S. PATENT DOCUMENTS

2013/0159826 A1* 6/2013 Mason .............. G06F 17/30873 715/205
2013/0297317 A1 11/2013 Lee et al.
2013/0304802 A1* 11/2013 Assadollahi ...... G06F 17/30867 709/203

FOREIGN PATENT DOCUMENTS

CN 101794292 A 8/2010
CN 102129440 A 7/2011
CN 102891874 A 1/2013

OTHER PUBLICATIONS

Tencent Technology, ISRWO, PCT/CN2015/070151, dated Mar. 27, 2015, 6 pgs.

(Continued)

*Primary Examiner* — Brian Whipple
(74) *Attorney, Agent, or Firm* — Morgan, Lewis & Bockius LLP

(57) ABSTRACT

Method and server system for providing recommendations during a chat session are disclosed. The method includes: processing instant messages transmitted during a chat session between a first user and one or more second users to obtain one or more keywords of a current conversation between the first user and the one or more second users; selecting at least one of the one or more keywords in accordance with a determination that the at least one keyword has remained relevant to the current conversation for at least a threshold time period; identifying one or more information items relevant to the at least one keyword in accordance with the selection of the at least one keyword; and providing the one or more information items to at least one of the first and second users for display within a
(Continued)

Client Device 104 conversation interface displaying the current conversation between the first and second users.

20 Claims, 17 Drawing Sheets

(51) Int. Cl.
*G06F 17/30* (2006.01)
*G06Q 10/10* (2012.01)
*G06Q 50/00* (2012.01)

(52) U.S. Cl.
CPC ............ *G06Q 50/01* (2013.01); *H04L 51/16* (2013.01); *H04L 51/20* (2013.01); *H04L 51/32* (2013.01)

(56) References Cited

OTHER PUBLICATIONS

Tencent Technology, IPRP, PCT/CN2015/070151, dated Jul. 26, 2016, 4 pgs.

* cited by examiner

Client Device 104

Client Device 104

Client Device 104

Client Device 104

Client Device 104

Client Device 104

Client Device 104

Client Device 104

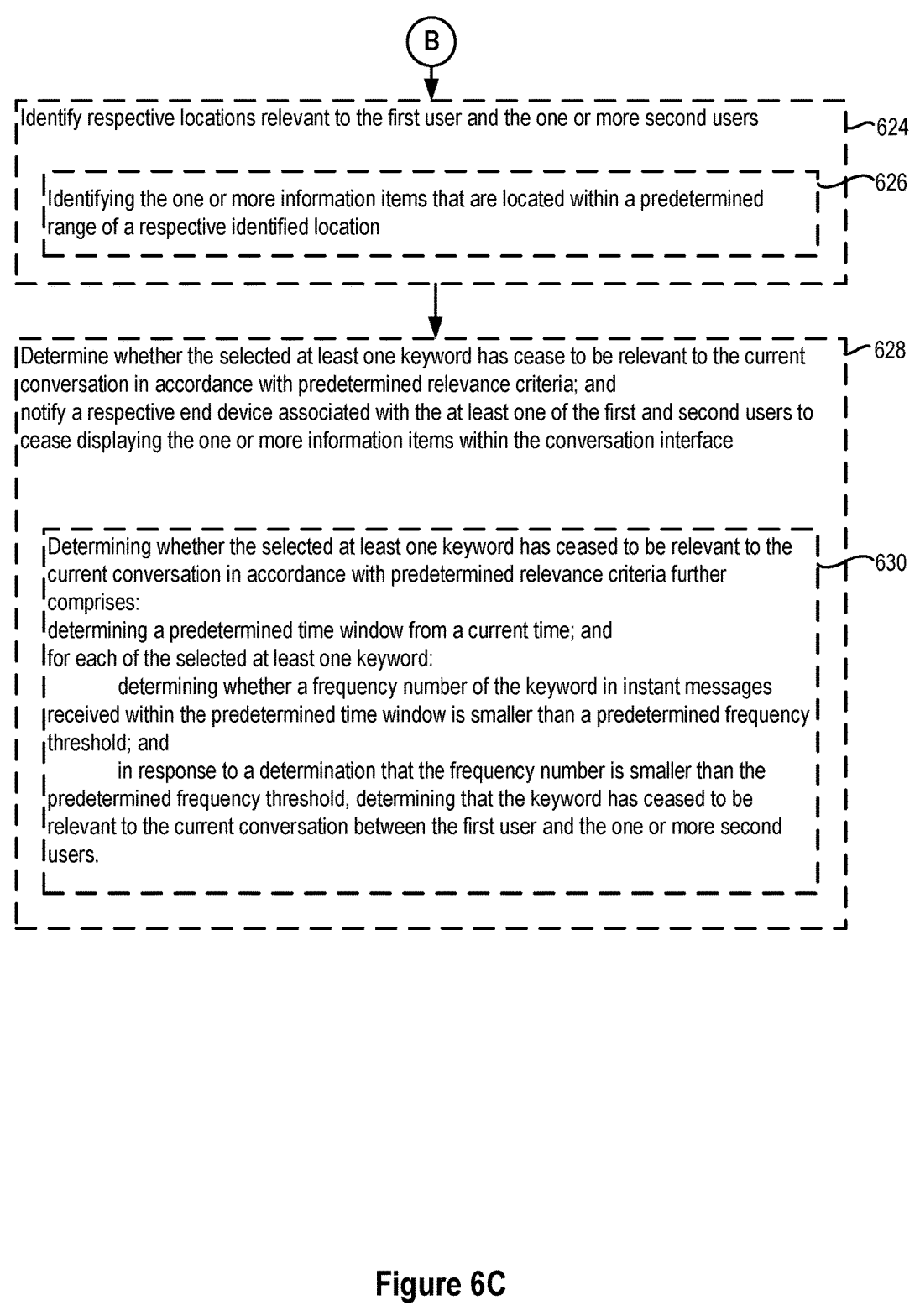

B

Identify respective locations relevant to the first user and the one or more second users 624

Identifying the one or more information items that are located within a predetermined range of a respective identified location 626

Determine whether the selected at least one keyword has cease to be relevant to the current conversation in accordance with predetermined relevance criteria; and
notify a respective end device associated with the at least one of the first and second users to cease displaying the one or more information items within the conversation interface 628

Determining whether the selected at least one keyword has ceased to be relevant to the current conversation in accordance with predetermined relevance criteria further comprises:
determining a predetermined time window from a current time; and
for each of the selected at least one keyword:
determining whether a frequency number of the keyword in instant messages received within the predetermined time window is smaller than a predetermined frequency threshold; and
in response to a determination that the frequency number is smaller than the predetermined frequency threshold, determining that the keyword has ceased to be relevant to the current conversation between the first user and the one or more second users. 630

Figure 6C

METHOD AND SYSTEM FOR PROVIDING RECOMMENDATIONS DURING A CHAT SESSION

PRIORITY CLAIM AND RELATED APPLICATION

This application is a continuation application of PCT Patent Application No. PCT/CN2015/070151, entitled "METHOD AND SYSTEM FOR PROVIDING RECOMMENDATIONS DURING A CHAT SESSION" filed on Jan. 6, 2015, which claims priority to Chinese Patent Application No. 201410025044.X, entitled "METHOD, APPARATUS, AND SYSTEM FOR RECOMMENDING LOCATION INFORMATION" filed on Jan. 20, 2014, both of which are incorporated by reference in their entirety.

TECHNICAL FIELD

The disclosed implementations relate to the field of information processing technologies, and in particular, to methods and systems for providing recommendations during a chat session.

BACKGROUND

In the current information age, various information devices are generated at the right moment. Moreover, with the unification of electronic consumption, computers, and communications (3C), people are increasingly paying attention to research of comprehensive utilization of information devices in various fields, so as to fully use existing resources and devices to better serve people.

Currently, multiple users (two or more than two) may attend a real-time chat session with voice information transmitted among the multiple users by using various voice chat tools. When a voice chat session is performed between users, chat contents may involve some geographical locations and/or service sites. If the user expects to obtain accurate positions of these geographical locations and/or names of the service sites, the user needs to manually input a text in another application software (APP), e.g., a location search APP which may be different from the voice chat APP, to search for a target result including one or more service sites with corresponding locations.

However in the conventional manners, a text is required to be manually input to search for a location, and operations may be complicated. Moreover, sometimes the manual input of the user's geographical location may not be properly implemented for searching, when the manual input of the geographical location is not very precise and accurate.

In addition, in the manner in the prior art, a user may have to automatically or manually switch among different APPs with separate user interfaces to perform the searching process and the voice chat, which further increases complexity of operations. Therefore, it is desirable to have more efficient methods, systems, and devices to improve the user experience for providing recommendations during a chat session.

SUMMARY

The embodiments of the present disclosure provide methods and systems for providing recommendations during a chat session.

In accordance with some implementations of the present application, a method for providing recommendations during a chat session is performed at a server system having one or more processors and a memory. The method includes: processing instant messages transmitted during a chat session between a first user and one or more second users to obtain one or more keywords of a current conversation between the first user and the one or more second users; selecting at least one of the one or more keywords in accordance with a determination that the at least one keyword has remained relevant to the current conversation for at least a threshold time period; in accordance with the selection of the at least one keyword, identifying one or more information items relevant to the at least one keyword; and providing the one or more information items to at least one of the first and second users for display within a conversation interface displaying the current conversation between the first and second users.

In another aspect, a computer system (e.g., server system 108, FIGS. 1-2) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computer system with one or more processors, cause the computer system to perform, or control performance of, the operations of any of the methods described herein. In some embodiments, a computer system includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosure as well as additional features and advantages thereof will be more clearly understood hereinafter as a result of a detailed description of preferred embodiments when taken in conjunction with the drawings.

To illustrate the technical solutions according to the embodiments of the present application more clearly, the accompanying drawings for describing the embodiments are introduced briefly in the following. The accompanying drawings in the following description are only some embodiments of the present application; persons skilled in the art may obtain other drawings according to the accompanying drawings without paying any creative effort.

FIGS. 6A-6C illustrate a flowchart diagram of a method for providing recommendations during a chat session in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
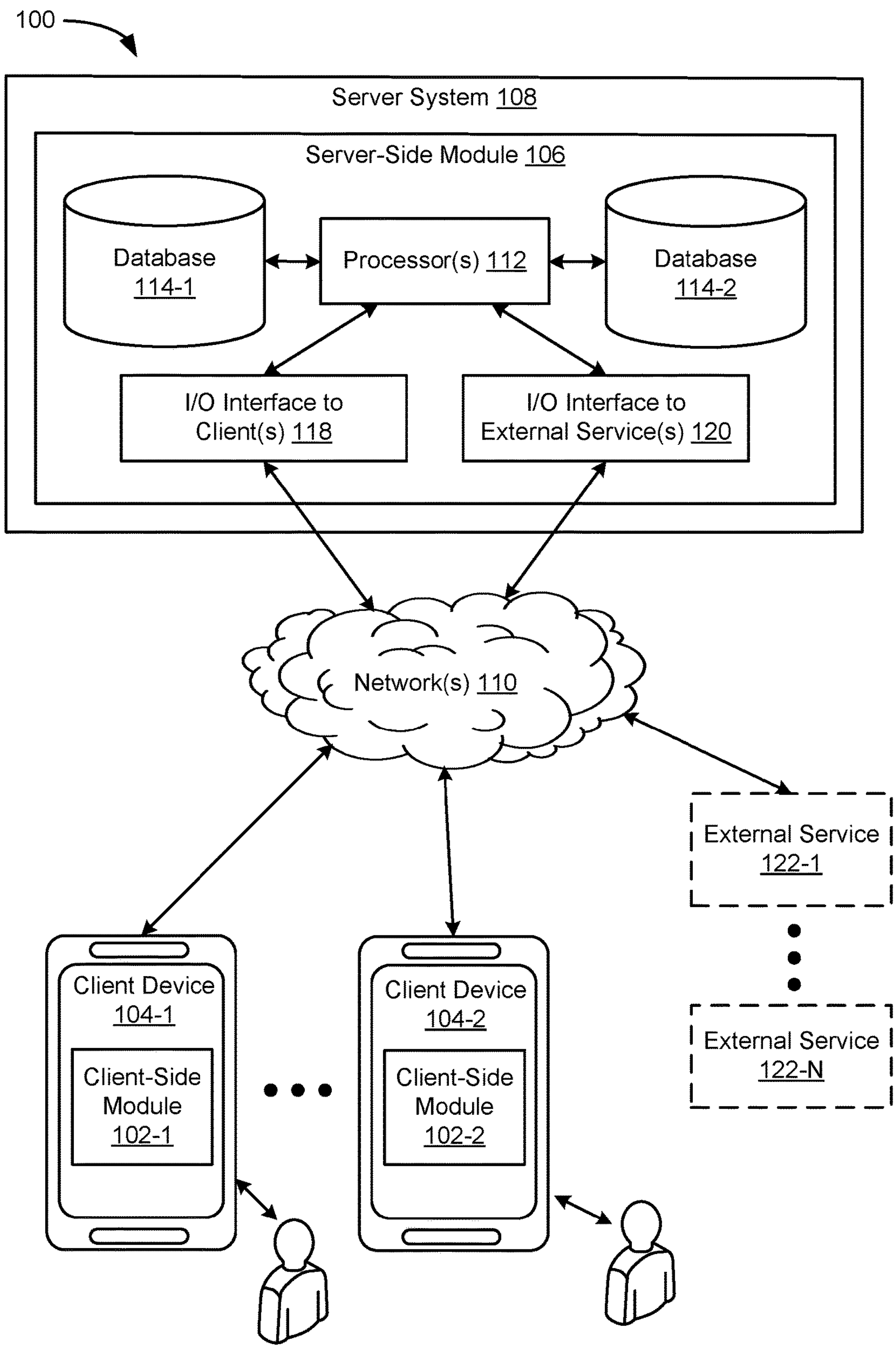
FIG. 1 is a block diagram of a server-client environment in accordance with some embodiments.

As shown in FIG. 1, providing recommendations during a chat session is implemented in a server-client environment 100 in accordance with some embodiments. In accordance with some embodiments, server-client environment 100 includes client-side processing 102-1, 102-2 (hereinafter "client-side module 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking platform (e.g., instant messaging, and social networking services) and communications with server-side module 106. Server-side module 106 provides server-side functionalities for the social networking platform (e.g., instant messaging, and social networking services) for any number of client modules 102 each residing on a respective client device 104.

In some embodiments, server-side module 106 includes one or more processors 112, one or more databases 114, an I/O interface to one or more clients 118, and an I/O interface to one or more external services 120. I/O interface to one or more clients 118 facilitates the client-facing input and output processing for server-side module 106. One or more processors 112 obtain instant messages during a chat session, process the instant messages, perform search as requested by the user, and provide requested search results to client-side modules 102. The database 114 stores various information, including but not limited to, service categories, service provider names, and the corresponding locations. The database 114 may also store a plurality of record entries relevant to the instant messages during a chat session. I/O interface to one or more external services 120 facilitates communications with one or more external services 122 (e.g., merchant websites, credit card companies, and/or other payment processing services).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a standalone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 2:
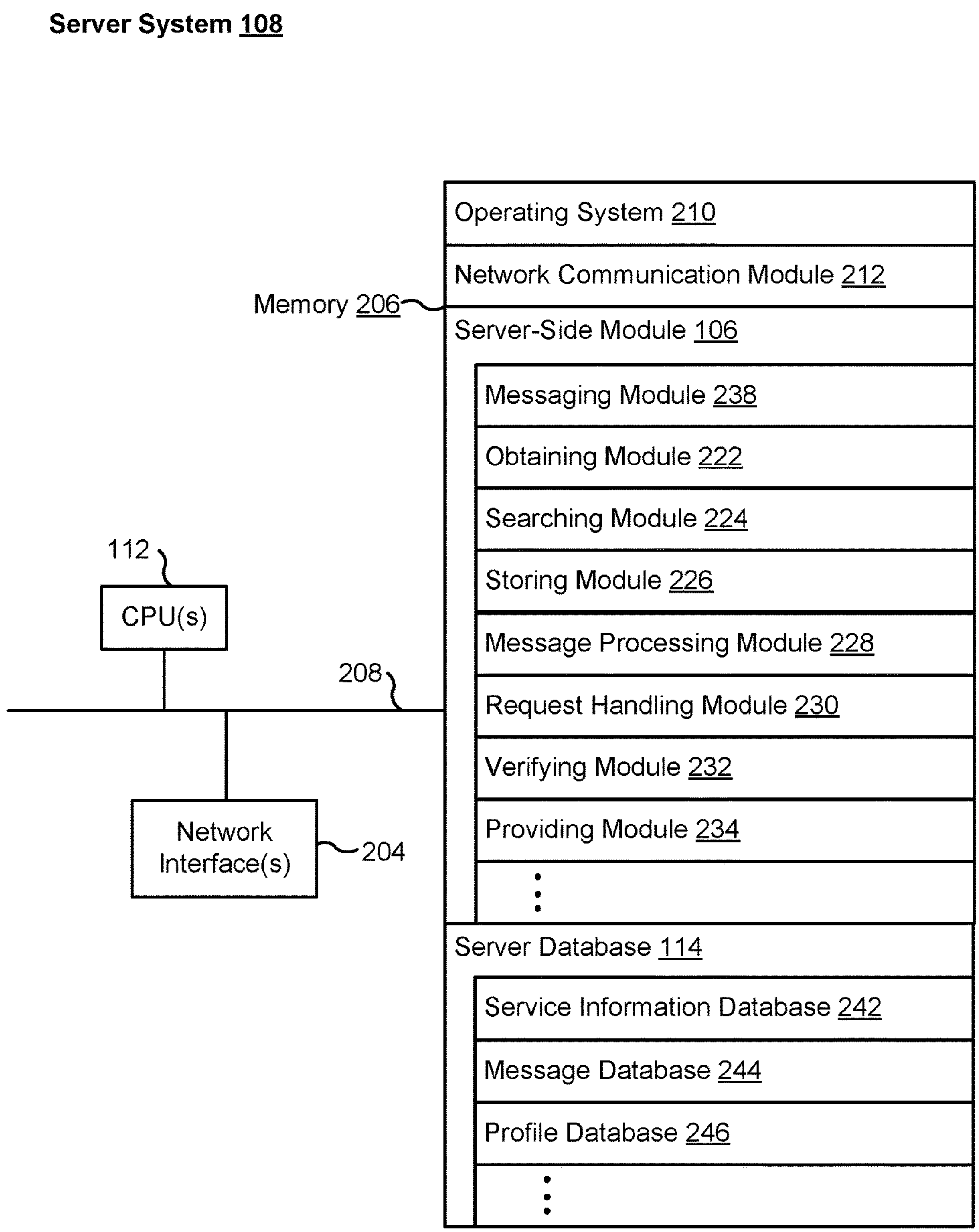
FIG. 2 is a block diagram of a server system in accordance with some embodiments.

FIG. 2 is a block diagram illustrating a server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104 and external service(s) 122) connected to one or more networks 110 via one or more network interfaces 204 (wired or wireless);

server-side module 106, which provides server-side data processing for the social networking platform (e.g., instant messaging, and social networking services), includes, but is not limited to:
- messaging module 238 for managing and routing instant messages exchanged during a chat session among users of the social networking platform;
- obtaining module 222 for obtaining, from the received instant messages exchanged during the chat session, one or more keywords;
- searching module 224 for searching, based on the one or more words obtained from the instant messages, the database 114 for relevant search results;
- storing module 226 for storing various information in the database 114, the various information including service categories, server provider names, corresponding locations, and entries relevant to the instant messages exchanged during a chat session;
- message processing module 228 for processing the instant messages obtained at the server system, e.g., including voice recognition and conversion of voice messages into text messages;
- request handling module 230 for handling and responding to requests from users of the social networking platform for various search results;
- verifying module 232 for verifying information related to the instant messages, such as keywords included in the instant messages, receiving time of the instant messages, and keyword frequencies in the instant messages; and
- providing module 234 for providing information items relevant to search results to the respective user in response to user's requests;

one or more server database 114 storing data for the social networking platform, including but not limited to:
- service information database 242 storing information including keywords related to, e.g., service categories, service provider names, and corresponding locations of the service providers;
- message database 244 storing chat record entries in accordance with the instant messages for respective users including one or more keywords exchanged during a chat session;
- profiles database 246 storing user profiles for users of the social networking platform, where a respective user profile for a user includes a user/account name or handle, login credentials to the social networking platform, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
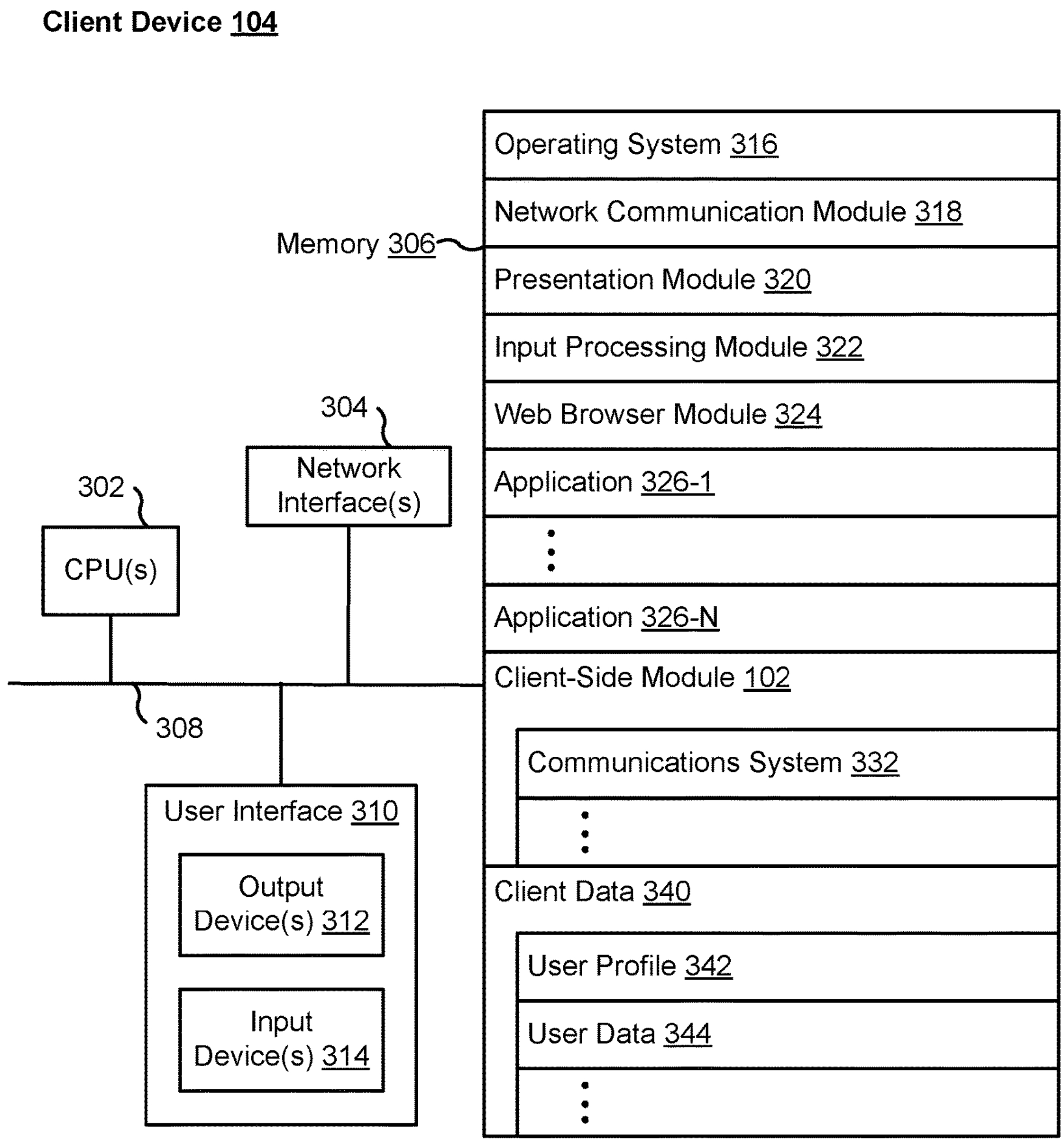
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:
- operating system 316 including procedures for handling various basic system services and for performing hardware dependent tasks;
- network communication module 318 for connecting client device 104 to other computing devices (e.g., server system 108 and external service(s) 122) connected to one or more networks 110 via one or more network interfaces 304 (wired or wireless);
- presentation module 320 for enabling presentation of information (e.g., a user interface for a social networking platform, widget, webpage, game, and/or application, audio and/or video content, text, etc.) at client device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- one or more applications 326-1-326-N for execution by client device 104 (e.g., games, application marketplaces, payment platforms, social network platforms, and/or other applications); and
- client-side module 102, which provides client-side data processing and functionalities for the social networking platform, including but not limited to:
  - communication system 332 for sending messages to and receiving messages from other users of the social networking platform (e.g., instant messaging, group chat, message board, message/news feed, and the like); and
- client data 340 storing data associated with the social networking platform, including, but is not limited to:

user profile 342 storing a user profile associated with the user of client device 104 including user a/account name or handle, login credentials to the social networking platform, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user; and user data 344 storing data authored, saved, liked, or chosen as favorites by the user of client device 104 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4A:
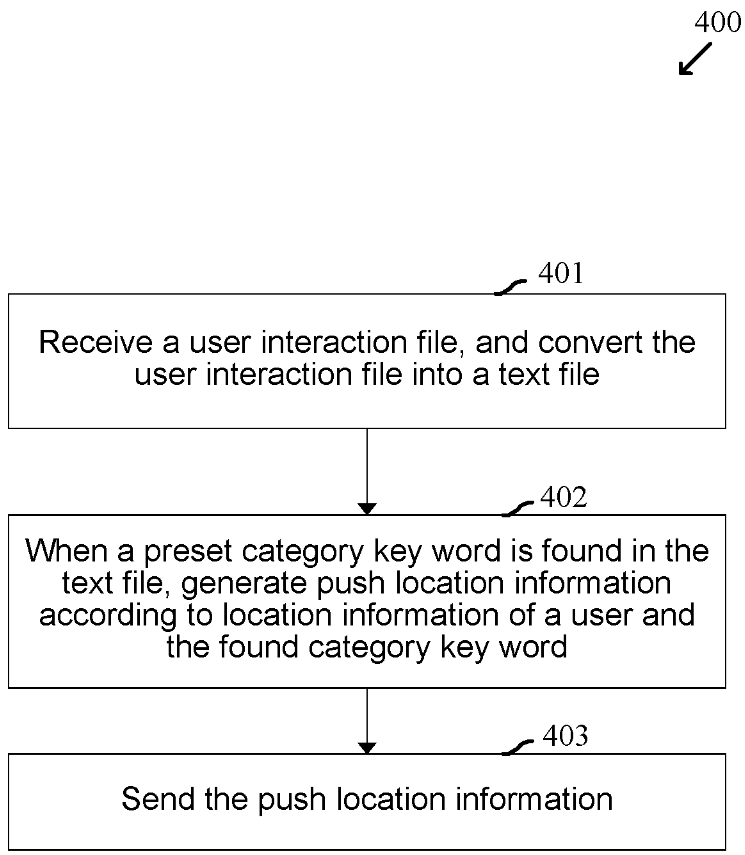
FIG. 4A is a flowchart of a method for recommending location information in accordance with some embodiments.

FIG. 4A is a flowchart of a method 400 for recommending location information according to an embodiment of the present disclosure. As shown in FIG. 4A, the method includes receiving (401) a user interaction file, and converting (401) the user interaction file into a text file. In some embodiments, the received user interaction file is a voice interaction file including interaction content in a voice format. For example, the interaction file may be an instant message exchanged between two or more users during a chat session.

In some embodiments, converting (401) the user interaction file into a text file includes: converting the voice file into the text file according to a voice recognition process including a training stage and a recognition stage. During the training stage, a user voice of a word in a preset glossary is collected. The preset glossary may include service category key words, service provider's names, and location words. The preset glossary may also include words that are related to the service categories, for example, "eat", "hungry", "delicious" are related to the restaurant category. During the training stage, a feature vector of the collected user voice is used as a template and the template is stored in a template library. During the recognition stage, the feature vectors of the voice files received are compared with the templates stored in the template library successively, and a template with the highest similarity is used as the text file to be outputted to the user's end device.

In some embodiments, receiving (401) a user interaction file includes: in an interaction process between mobile terminals, for example, a chat session between two or more users using the mobile end devices, the end devices collect and send the user interaction files to the server. The server is configured to receive the collected user interaction file. The embodiment of the present disclosure is particularly applicable to an application environment in which an interaction chat session is conducted between two or more users using the mobile end devices.

In some embodiments, a server at a network side may receive a user voice file. The voice file received by the server may be a voice which is recorded in real time during the voice chat of the user. In some embodiments, the recorded voice may be a complete audio file. In some embodiments, the recorded voice may be a real-time audio streaming file.

In some embodiments during a voice chat session, the server at the network side may directly record the user voice file. In some embodiments, a user end device may first record a voice and then send the recorded user voice file to the server.

After receiving the user voice file, the server converts the voice file to the text file according to the voice recognition process as discussed earlier. In some embodiments, the server may perform voice recognition by means of a pattern matching method. When the pattern matching method is used, a process of voice recognition generally includes two parts, which are the training stage and the recognition stage separately.

At the training stage, the server collects the word in the user's voice in the preset glossary, where the glossary includes the category key word. The server also uses the feature vector of the collected user voice as the template and stores the template in the template library.

At the recognition stage, the server performs similarity comparison between the feature vector of the received and recorded voice file and the templates in the template library successively, and uses the template with the highest similarity for outputting the text file.

In some embodiments, before performing feature extraction on the voice file, a front-end processing may be first performed to the received voice file. The front-end processing is performed to the voice file to partially eliminate effects generated by noises and different speakers, so that a processed signal can better reflect substantive characteristics of the voice.

In some embodiments, the front-end processing includes endpoint detection and voice enhancement. The endpoint detection refers to distinguishing voice and non-voice signal time periods in a voice signal, and accurately determining a starting point of the voice signal. After the endpoint detection, subsequent processing may only be performed to the voice signal, which plays an important role in improving accuracy and a recognition correct rate of a model. A main task for voice enhancement is eliminating effects of environmental noises on the voice. In some embodiments, Wiener filtering is used. When the voice file comprises a great amount of noise, this method may be more effective than other filters. under the circumstance that noises are large.

In some embodiments, one or more voice recognition performance indexes of the server may include: 1. a glossary range: a range of words or phrases which can be recognized by a machine, and if the glossary range is not limited, it may be considered that the glossary range is infinite; 2. speaker limitation: whether a voice can be recognized as of only a specified speaker, or a voice of any speaker can be recognized; 3. training requirements: whether training is required before use, that is, whether the machine is made to "listen" to a given voice prior to receiving the voice file, and if so, how many times of training are needed; 4. correct recognition rate: an average percentage for correct recognition, which is related to the foregoing three indexes 1-3.

An exemplary process of voice recognition is described above in detail, and a person skilled in the art may understand that, the descriptions are illustrative, and are not used for limiting the embodiment of the present disclosure.

In some embodiments, when a preset category key word is found in the text file, the method 400 further includes generating (402) push location information according to the location information of the user and the category key word identified in the voice file.

Various kinds of category key words may be preset. In some embodiments, the category key word may include a geographical location category key word, and the geographical location category key word may include a name of a geographical location. For example, the geographical location category keywords may include "Wudaokou," "Sidakou," "Baizhifangqiao," "Fuxingmen," "Dinghuisi," and the like.

In some embodiments, the category keywords may further include a service category keyword, and the service category keyword may include a category name of a service site. For example, the service category keywords may include "restaurant," "bar," "cinema," "night club," "KTV," "supermarket," and the like.

In some embodiments, the category keywords may further include a keyword of a service provider's name, such as a specific name of a service provider. For example, the service provider name keywords may include "Haidilao," "Xiaofeiyang," "Malayouhuo," and the like.

Exemplary examples of the category keywords are described above in detail, and a person skilled in the art may understand that, the descriptions are illustrative, and are not used for limiting the embodiment of the present disclosure.

In some embodiments, the server may further obtain geographical location information of the user end device by using multiple manners. In some embodiments, the server may obtain the geographical location information of the user terminal by using a GPS based positioning manner. In the GPS based positioning manner, a GPS based positioning module in the user terminal is used to send a location signal of the user terminal to the server so as to implement positioning of the user terminal.

In some embodiments, the server may further obtain the geographical location information of the user terminal by using a base station of a mobile operation network. Base station based positioning uses a measured distance from a base station to the user terminal to determine a location of a mobile phone. In this positioning manner, the mobile phone does not need to have a GPS based positioning capability, but, the precision largely depends on distribution of the base station and a size of coverage.

The implementation manner for the server to obtain the geographical location information of the user terminal is described above in detail, and a person skilled in the prior art may understand that, the descriptions are exemplary, and are not used for limiting the embodiment of the present disclosure.

In some embodiments, generating (402) the push location information according to the location information of the user and the found category key word includes: searching for a point of interest which has a same categorical attribute as the category key word, and combining the found points of interest into a set of points of interest; further searching the set of points of interest for a point of interest that is located from the location information of the user by a geographical distance less than a preset distance threshold, and combining found points of interest into a subset of points of interest; and combining points of interest in the subset of points of interest into the push location information.

For example, when an identified category key word is "restaurant" and location information of a user is "Wudaokou Hualian Shopping Center". Generating (402) the push location information includes: first, search for a point of interest with a categorical attribute of "restaurant," and combine found points of interest into a set of points of interest; and then, further search within the set of points of interest for a point of interest that is spaced from the Wudaokou Hualian Shopping Center by a geographical distance less than a preset distance threshold, and combine found points of interest into a subset of points of interest; and then combine points of interest in the subset of points of interest into the push location information.

In some embodiments, generating (402) push location information according to the location information of the user and the found category key word includes searching for the point of interest that is spaced from the location of the user by the geographical distance less than a preset distance threshold, and combining found points of interest into a set of points of interest; further searching the set of points of interest for a point of interest which has the same categorical attribute as the category key word, and combining found points of interest into a subset of points of interest; and combining the points of interest in the subset of points of interest into the push location information.

For example, when an identified category key word is "restaurant" and location information of a user is "Wudaokou Hualian Shopping Center". Generating (402) the push location information includes: first, search for a point of interest that is spaced from the Wudaokou Hualian Shopping Center by a geographical distance less than a preset distance threshold, and combine found points of interest into a set of points of interest; and then, further search the set of points of interest for a point of interest with the same categorical attribute of "restaurant," and combine found points of interest into a set of points of interest; and combine the points of interest in the subset of points of interest into the push location information.

In some embodiments, when the user interaction file is a voice interaction file, the voice interaction file further has a time attribute which tracks when or how long ago has the interaction file been generated. The time attribute of the user voice file may be used to determine whether it is necessary to perform voice recognition process. For example, the voice recognition process may not be performed on an earlier user voice file, but only be performed on a current user voice file or a user voice file within a preset time range, so as to conserve processing resources of the server.

In some embodiments, an effective time threshold is further set on the server. After the server receives the user voice file, it is further determined whether an expiration time (such as a period of time from the recoding time) of the user voice file is within the effective time threshold: if yes, convert the voice file to the text file according to the voice recognition manner, or if not, exit the process.

In some embodiments, the method further includes setting a category key word frequency threshold. When a preset category key word is found in the text file, the method 400 further determines whether frequency of occurrence of the found category key word within a preset time is greater than the category key word frequency threshold: if yes, generating (402) the push location information according to the location information of the user and the found category key word; or if not, exiting the process.

In some embodiments, the method 400 further includes sending (403) the push location information. In some embodiments, the server sends (403) the push location information to the terminal. The terminal may display the push location information around a current user location on a map interface. When the push location information on the map interface is triggered by the user, the server may calculate a recommended path between the current location information of the user and the triggered push location information; and then sends the recommended path to the terminal for displaying.

For example, in a scenario based on the voice chat, if a certain key word (such as restaurant) occurs for N times (N is an empirical value which can be adjusted) within preset M minutes (M is an empirical value which can be adjusted) in the voice chat content of the user, geographical information of the services in this category near the user is automatically recommended to the user who has sent this kind of message during the voice chat session. (For example, "restaurant" has occurred in a voice of A, and a map of restaurants near A is recommended to A). The user may rapidly view all messages of adjacent locations in the category.

Figure 4B:
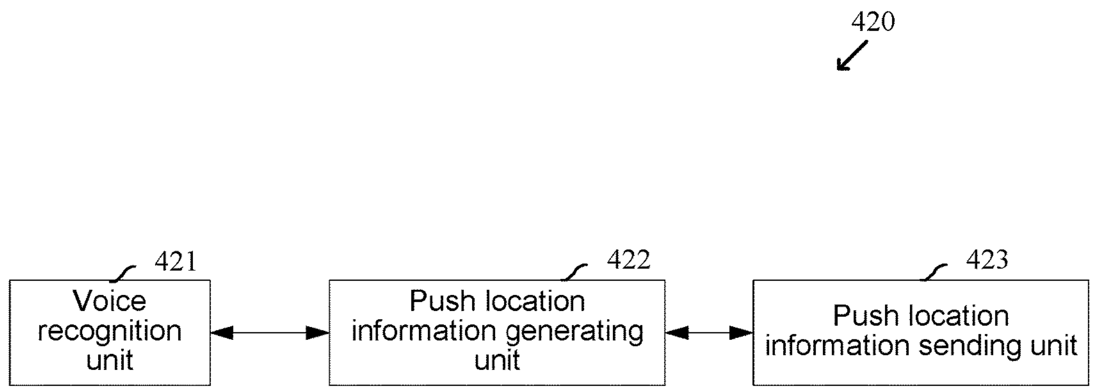
FIG. 4B is a structural diagram of an apparatus for recommending location information in accordance with some embodiments.

Based on the foregoing detailed analysis, an embodiment of the present disclosure further provides an apparatus 420 for recommending location information. FIG. 4B is a structural diagram of an apparatus 420 for recommending location information according to an embodiment of the present disclosure. As shown in FIG. 4B, the apparatus includes a voice recognition unit 421, a push location information generating unit 422, and a push location information sending unit 423. The voice recognition unit 421 is used for receiving a user voice file, and converting the voice file to a text file according to a voice recognition manner. The push location information generating unit 422 is used for, when a preset category key word is found in the text file, generating push location information according to location information of a user and the identified category key word. The push location information sending unit 423 is used for sending the push location information.

In some embodiments, the push location information generating unit 422 is used for searching for a point of interest which has a same categorical attribute as the category key word identified in the voice file, and for combining the found points of interest into a set of points of interest. The push location information generating unit 422 is further used for searching in the set of points of interest for a point of interest that is located from the location of the user by a geographical distance less than a preset distance threshold, and combining the found points of interest into a subset of points of interest. The push location information generating unit 422 is then user for combining points of interest in the subset of points of interest into the push location information.

In some embodiments, the push location information generating unit 422 is used for searching for a point of interest that is located from the location of the user by a geographical distance less than a preset distance threshold, and for combining found points of interest into a set of points of interest. The push location information generating unit 422 is further used for searching the set of points of interest for a point of interest which has a same categorical attribute as the category key word, and combining the found points of interest into a subset of points of interest. The push location information generating unit 422 is then user for combining points of interest in the subset of points of interest into the push location information.

In some embodiments, the voice recognition unit 421 is used for setting an effective time threshold, and after the user voice file is received, it is further determined whether an expiration time of the user voice file is within the effective time threshold: if yes, the server converts the voice file to the text file according to the voice recognition manner; and if not, exiting the process.

In some embodiments, the push location information generating unit 422 is used for setting a category key word frequency threshold, and when the preset category key word is identified in the text file, it is further determined whether the frequency of the occurrence of the identified category key word in a preset time is greater than the category key word frequency threshold: if yes, the server generates the push location information according to the location information of the user and the identified category key word; and if not, exiting the process.

In some embodiments, the user interaction file is a voice interaction file. The voice recognition unit 421 is used for converting the voice file into the text file according to the voice recognition manner. In some embodiments, at a training stage of the voice recognition process, a user voice of a category keyword in a preset glossary is collected, a feature vector of the collected user voice is used as a template, and the template is stored in a template library. At a recognition stage, similarity comparison is performed between the feature vector of the received voice file and templates in the template library successively, and a template with the highest similarity is used as the text file that is output.

In some embodiments, the apparatus further includes a displaying unit (not shown), where the displaying unit is used for displaying the push location information on a map interface. When the push location information is triggered, a recommended path between the location of the user and the triggered push location information is calculated, and then the recommended path is displayed on the map interface.

Figure 4C:
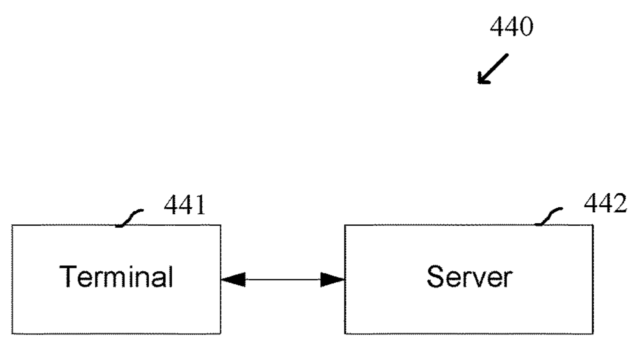
FIG. 4C is a structural diagram of a system for recommending location information in accordance with some embodiments.

Based on the foregoing detailed analysis, an embodiment of the present disclosure further provides a system for recommending location information. FIG. 4C is a structural diagram of a system 440 for recommending location information according to some embodiments of the present disclosure. As shown in FIG. 4C, the system 440 includes a terminal 441 and a server 442. The terminal 441 is used for recording a user voice file, and sending the user voice file to the server 442. The server 442 is used for receiving a user interaction file, and converting the user interaction file into a text file. The server 442 is also used for, when a preset category key word is identified in the text file, generating push location information according to the location information of a user and identified found category key word, and sending the push location information to the terminal 441. The terminal 441 is further used for displaying the location information.

In some embodiments, the terminal 441 is used for displaying the push location information on a map interface; and the server 442 is used for, when the push location information is triggered, calculating a recommended path between the location of the user and the triggered push location information, and sending the recommended path to the terminal 441 for displaying.

FIGS. 5A-5I illustrate a user interface 500 for a social networking platform/application displayed on client device 104 (e.g., a mobile phone); however, one skilled in the art will appreciate that the user interfaces shown in FIGS. 5A-5I may be implemented on other similar computing devices. The user interfaces in FIGS. 5A-5I are used to illustrate the processes described herein, including the processes described with respect to FIGS. 6A-6C. In some embodiments, the user interface 500 is included in a social networking platform for chatting between two or more users.

Figure 5A:
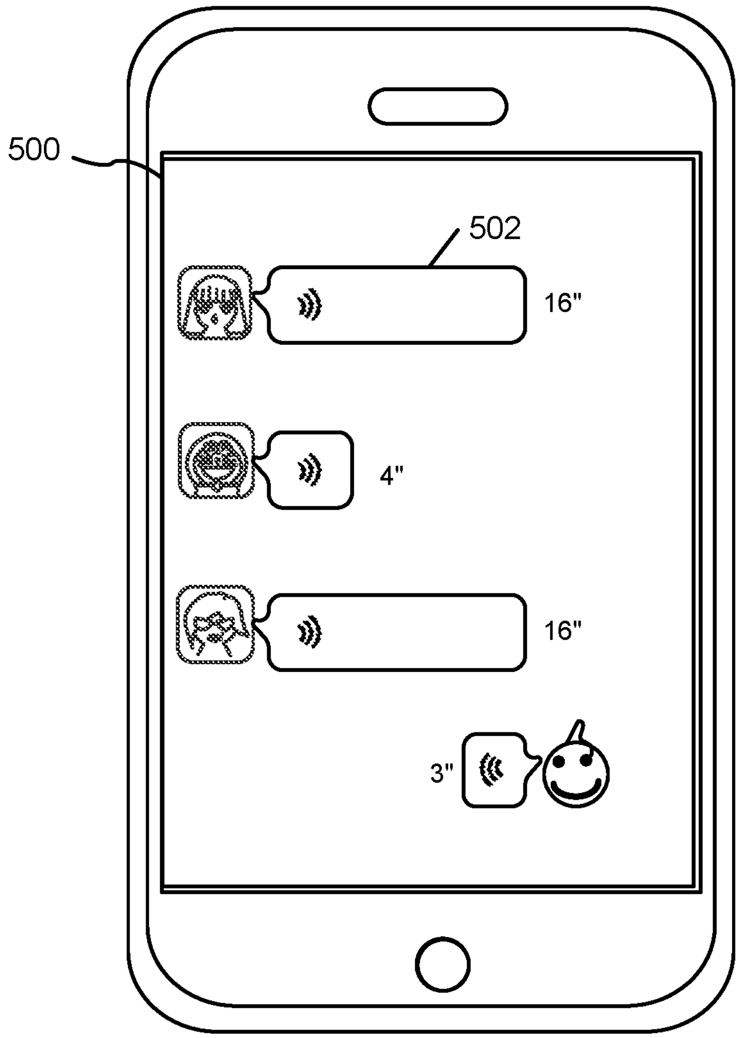
FIGS. 5A-5I illustrate exemplary user interfaces for providing recommendation information during a chat session in accordance with some embodiments.

As shown in FIG. 5A, during a chat session between a first user and one or more second users, instant messages are transmitted and displayed on the user interface 500. In some embodiments, the user interface 500 is a conversation interface which is shown on respective client devices associated with the first user and the one or more second users. In some embodiments, the instant messages are audio messages as indicated by the audio bubbles 502.

Figure 5B:
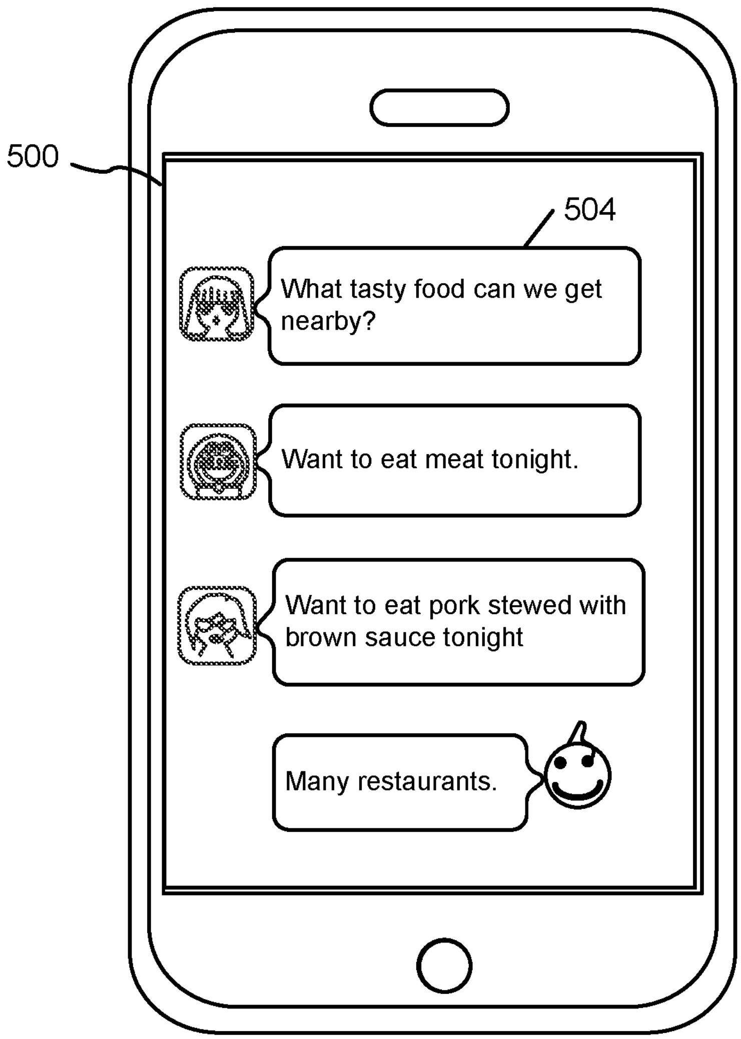

As shown in FIG. 5B, the instant messages in audio bubbles 502 may be converted into text messages 504 which are displayed on the same conversation interface 500 during the chat session. The audio messages 502 may be converted using any suitable voice recognition process as discussed earlier in the present disclosure. In some embodiments, the instant messages, such as the audio messages 502 and/or text messages 504, include one or more keywords which are for searching and providing recommendations to the users, as discussed later in further details with regard to FIGS. 6A-6C. The one or more keywords may be predetermined and stored at a database (e.g., service information database 242, FIG. 2) at the server 108. In some embodiments, the occurrence frequency, e.g., how many times within a predetermined period of time, of the one or more keywords in the instant messages may be tracked and determine if the one or more keywords are relevant and may be used for generating recommendations. For example, the one or more keywords as shown in the exemplary embodiment of FIG. 5B may include "food", "eat", and "restaurants". In some embodiments, the instant messages transmitted during the chat session are sent from the client device 104 to the server 108 for further processing, such as identifying one or more keywords in the instant messages. In some embodiments, the instant messages may also be processed to identify the one or more keywords at the client device 104.

Figure 5C:
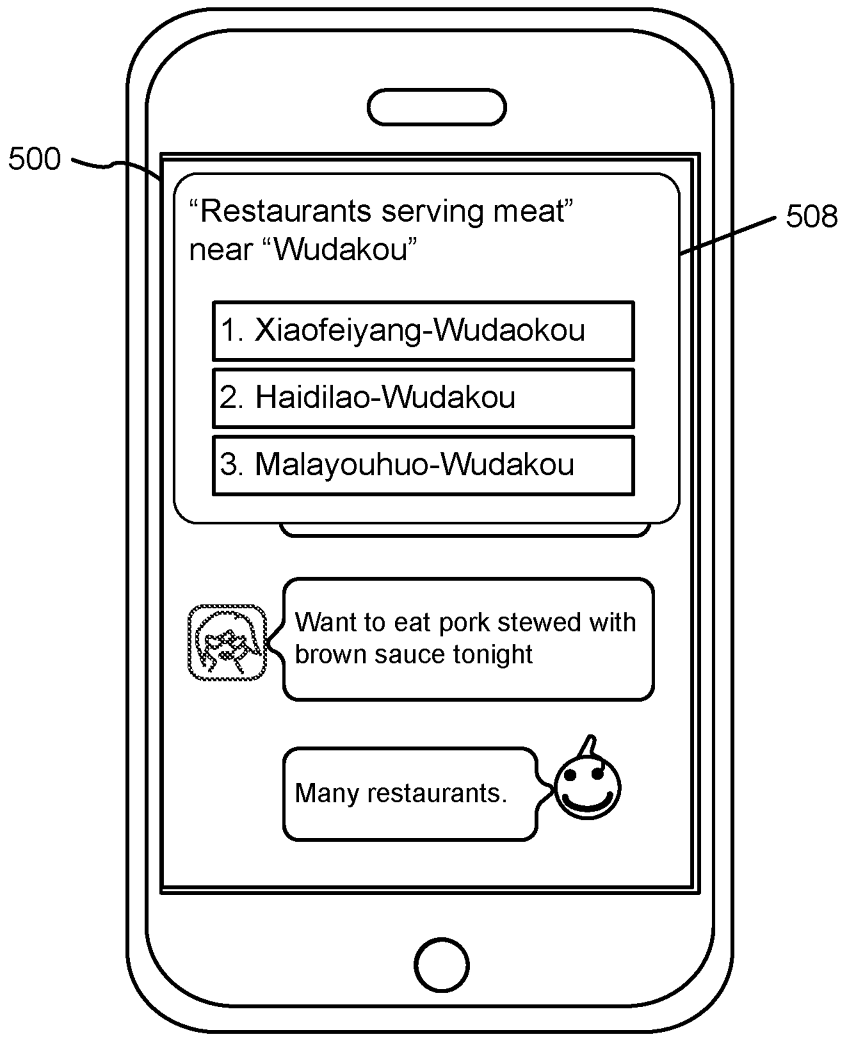

FIG. 5C illustrates an exemplary embodiment of displaying the recommendations 508, which are provided based on the one or more keywords, on the conversation interface 500. In some embodiments, the server 108 may search the database (e.g., service information database 242, FIG. 2) to identify the search results based on at least one of the one or more keywords. The at least one of the one or more keywords is determined to be relevant, and the search results are use for generating the recommendations for displaying on the conversation interface 500. In some embodiments, the current geological location of the first user is also identified using any appropriate technologies, such as GPS, or mobile operation network as discussed earlier in the present disclosure. As shown in FIG. 5C, when the first user's current location is identified to be "Wudaokou", recommendations of the restaurants near Wudaokou, such as "Xiaofeiyang", "Haidilao", and "Malayouhuo", are displayed on the conversation interface 500.

Figure 5D:
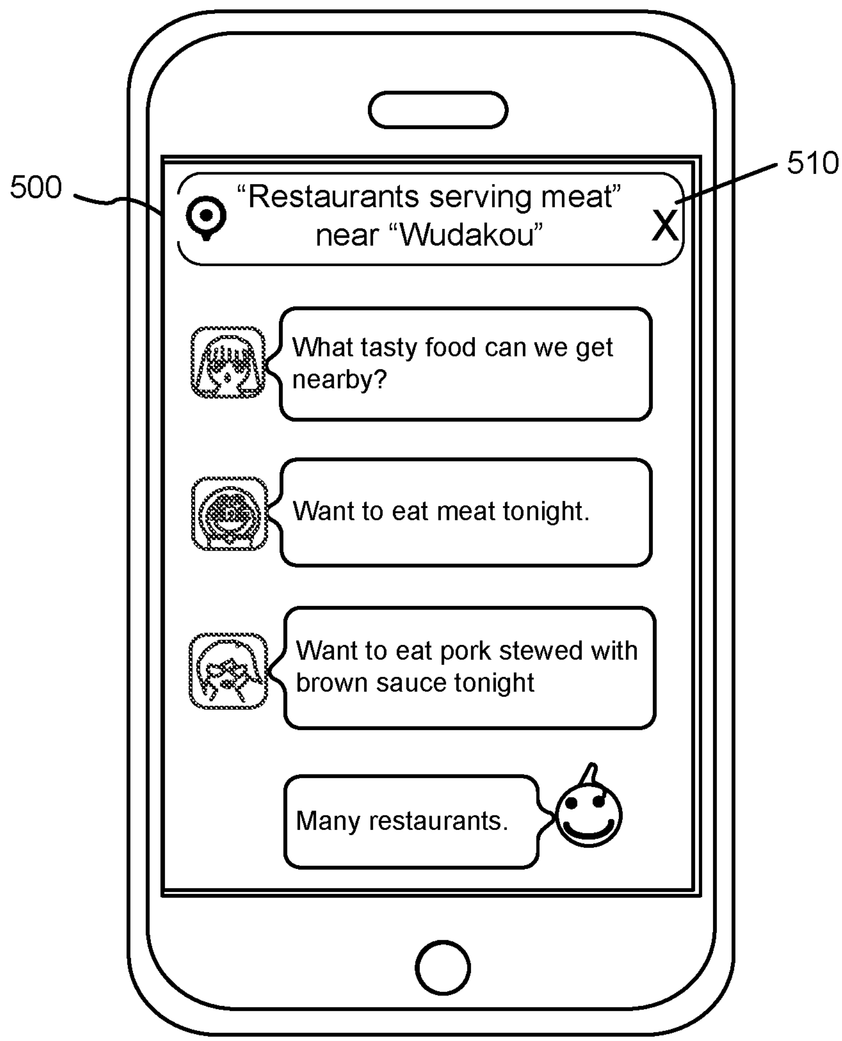
Figure 5E:
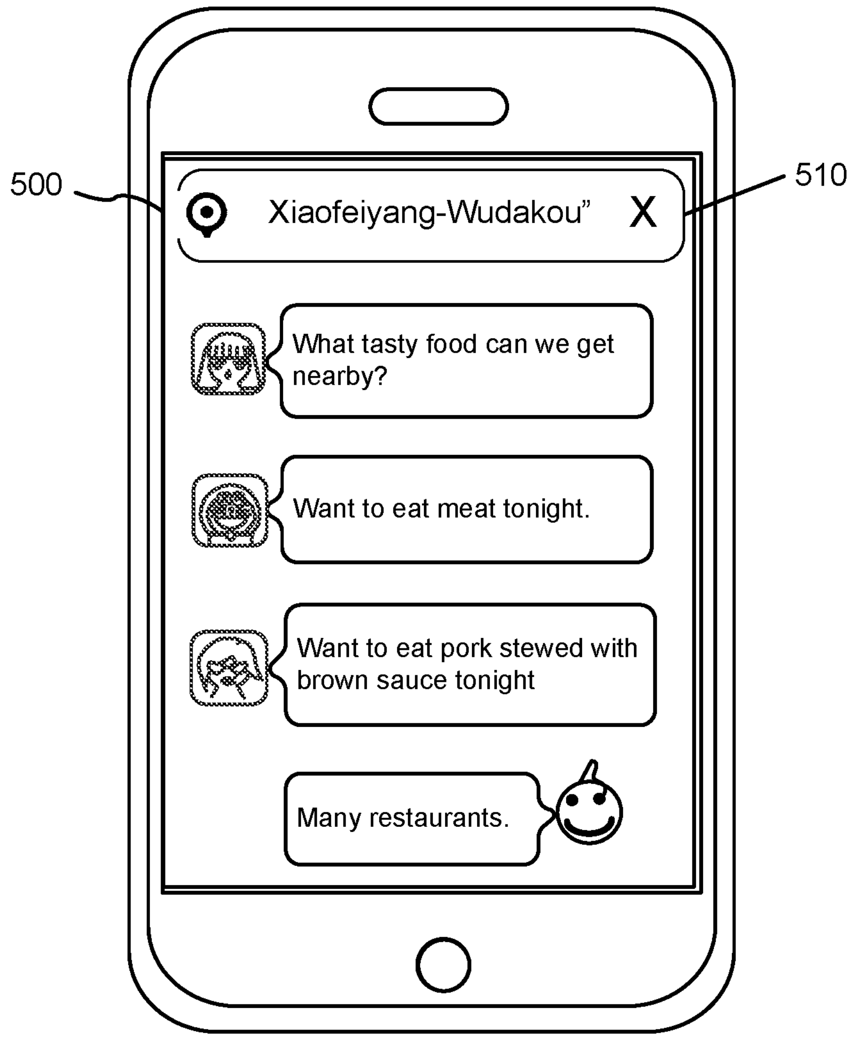

FIGS. 5D-5E illustrate an alternative embodiment of displaying the recommendations with a scrollbar 510 on the conversation interface 500. As shown in FIGS. 5D-5E, instead of displaying all the recommendations on the conversation interface 500 as shown in FIG. 5C, each of the recommendations is displayed one at a time with a scrollbar 510 at the top of the conversation interface 500.

Figure 5F:
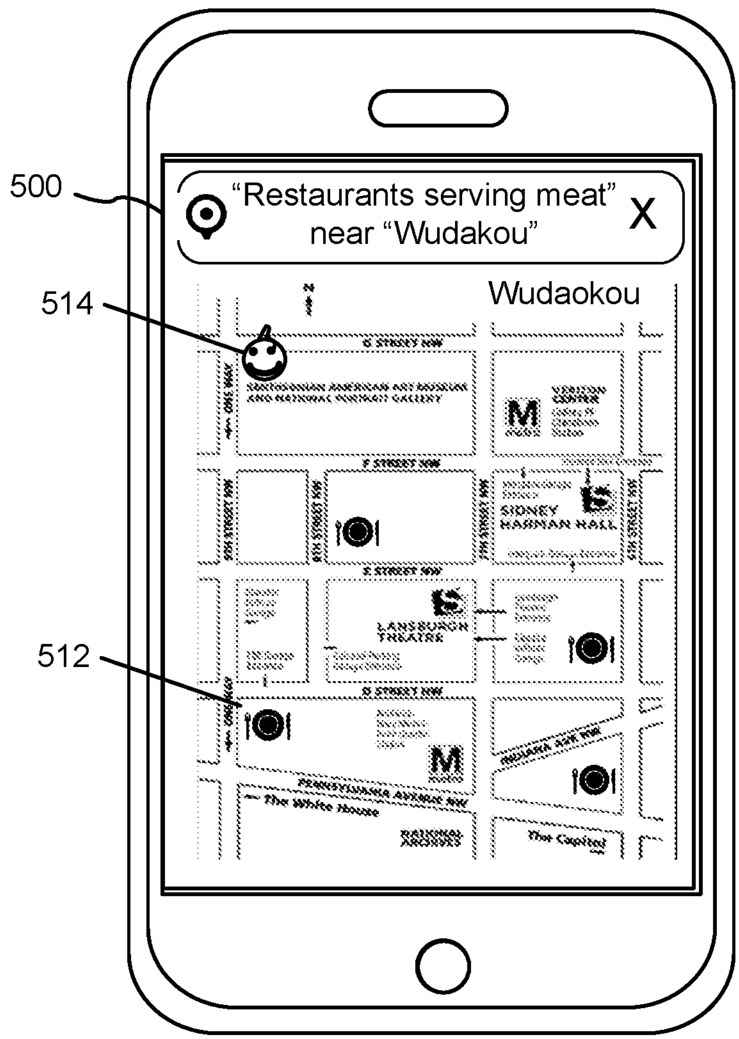

FIG. 5F shows an exemplary embodiment of displaying the one or more recommendations using icons 512 on a map on the user interface 500. The current location 514 of the user may also be displayed on the map. In some embodiments, upon a selection of recommendation from the user, a route from the current location of the user to the location of the selected recommendation may be shown on the map.

Figure 5G:
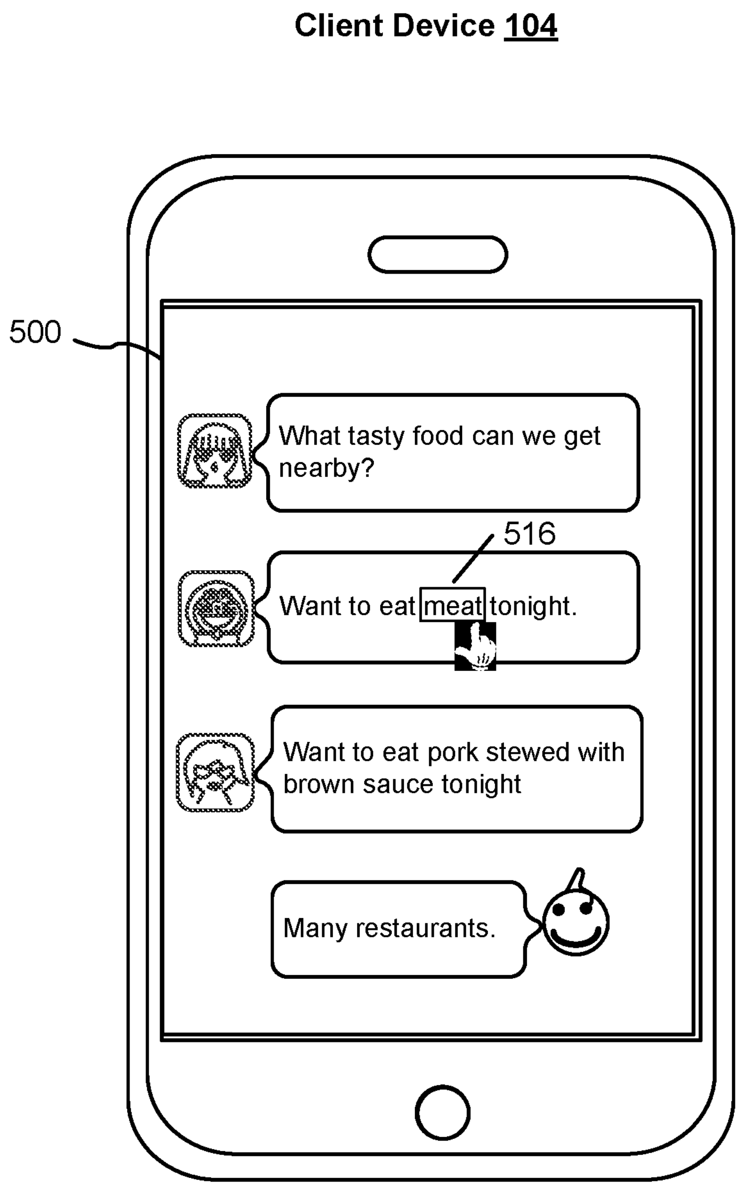

FIG. 5G illustrates an alternative exemplary embodiment for selecting the one or more keywords for generating recommendations. As shown in FIG. 5G, the user may select one or more keywords, e.g., "meat", from the text messages displayed on the conversation interface 500 during the chat session to be used for generating recommendations. For example, after the user selects one or more keywords by long pressing (516) the one or more keywords on the screen, the client device 104 may send the selected keywords to server 108 for processing and generating recommendations based on the user's selections.

Figure 5H:
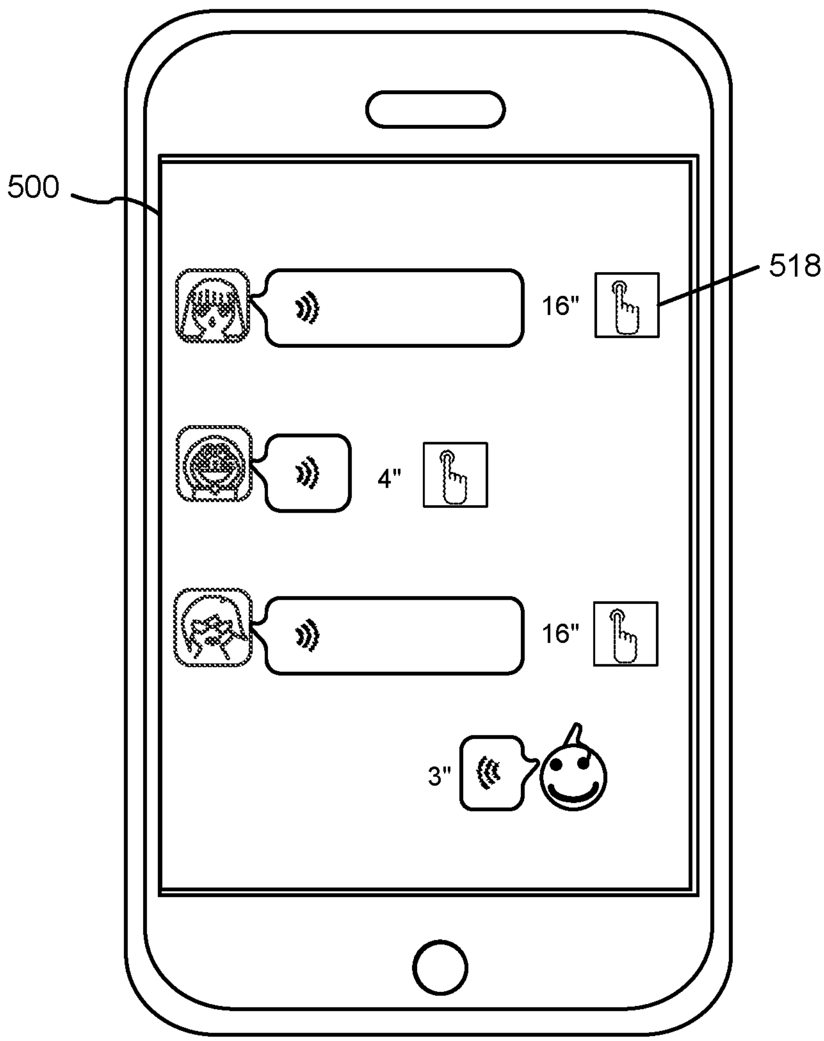
Figure 5I:
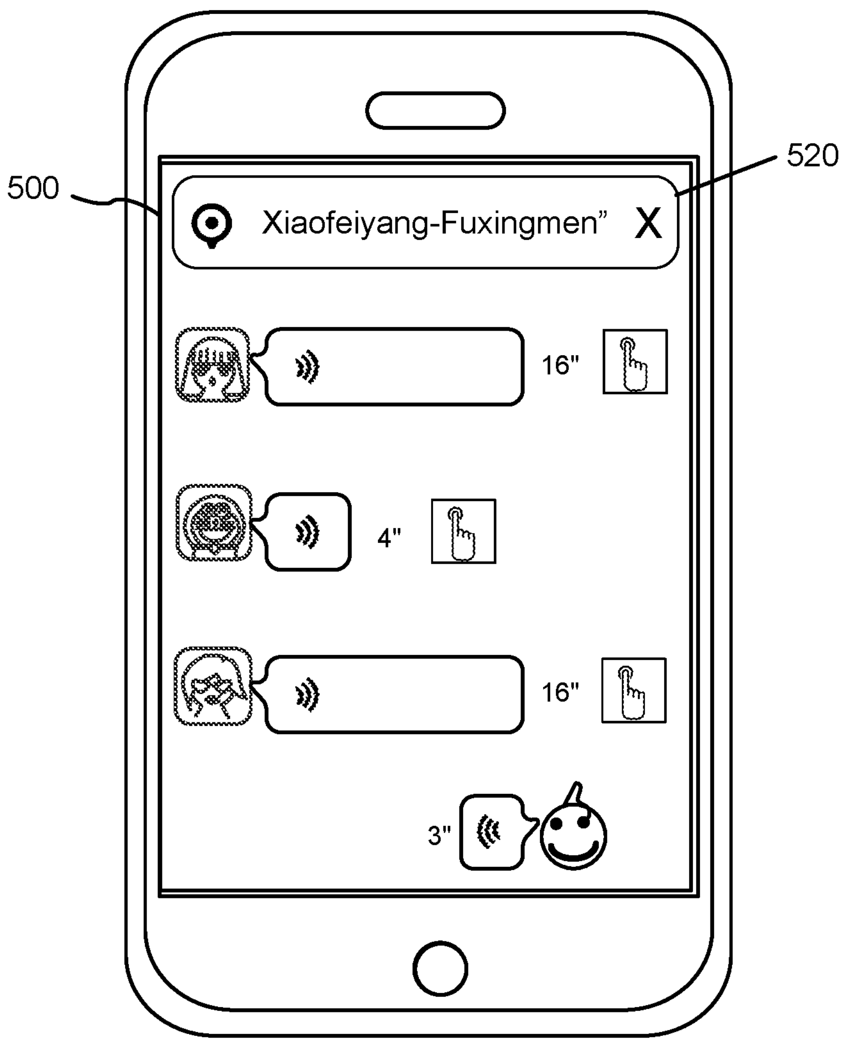

FIGS. 5H-5I illustrate another exemplary embodiment for viewing recommendations provided to the one or more second users who are attending the same chat session with the first user. For example as shown in FIG. 5H, respective icons 518 may be displayed beside the audio bubbles indicating the audio messages of the respective second users, and the first user may press an icon 518 to select to view the recommendations provided to the corresponding second user. As shown in FIG. 5I, a current location of a second user is identified to be "Fuxingmen", and after the first user selects to view the recommendations provided to this second user, a recommendation 520 may be displayed on the user interface 500 on the client device 104 of the first user. The recommendation 520 of this second user may include "Xiaofeiyang" near "Fuxingmen" as shown in FIG. 5I. In some embodiments, all the recommendations provided to the selected second user may be displayed on the user interface 500. In some embodiments, each recommendation provided to the selected second user may be displayed one at a time with a scrollbar, which is similar to the scrollbar discussed in FIGS. 5D-5E. In some embodiments, the one or more recommendations provided to the selected second user may also be displayed on a map as shown in FIG. 5F.

FIGS. 5A-5I are exemplary embodiments and are not intended to be limiting. The present disclosure may be implemented in various embodiments. In some examples, the database (e.g., service information database 242, FIG. 2) storing the one or more predetermined keywords may be generated in the server by manual operation or data mining or by means of a combination of manual operation and data mining. Moreover, the server may further create a database (e.g., message database 244, FIG. 2) for which an occurrence frequency of the one or more keywords, including a number of times (e.g., N times) within an expiration time (e.g., M minutes), is set. The one or more instant messages including the one or more keywords satisfying the occurrence frequency may be stored in the message database 244. In the message database 244, the instant messages may also be sorted using user accounts, keywords, and times as keywords for searching and generating recommendations.

For example, when it is determined, by matching, that a keyword W exists in a chat record sent by a user U at time T, a query record with a search key being U+W+T is inserted in the message database 244. When the number of records with the U+W+T being the key in the message database is greater than N, a recommendation message is generated by the server and is sent to the client device to be viewed by the user. In some examples, after receiving a recommendation prompt, a client displays the recommendation message, and after the user clicks the recommendation prompt, a map link is opened on the user interface to the client, to display the recommended information with a geographical location of the user as a center and with the recommendations generated based on the keyword W (e.g., FIG. 5F).

The user may perform voice chat by using terminals of various types. For example, the user may switch rooms in terminals, such as a feature phone, a smart phone, a hand-held computer, a personal computer (PC), a tablet computer or a personal digital assistant (PDA). These terminals may be installed with operating systems, including but not limited to: a Windows operating system, a LINUX operating system, an Android operating system, a Symbian operating system, a Windows mobile operating system, and an iOS operating system. Specific types of some terminals and specific types of operating systems are described above in detail, but a person skilled in the art may understand that, embodiments of the present disclosure are not limited to the types described above, and may further be applicable to any other type of terminals and any other type of operating systems.

Figure 6A:
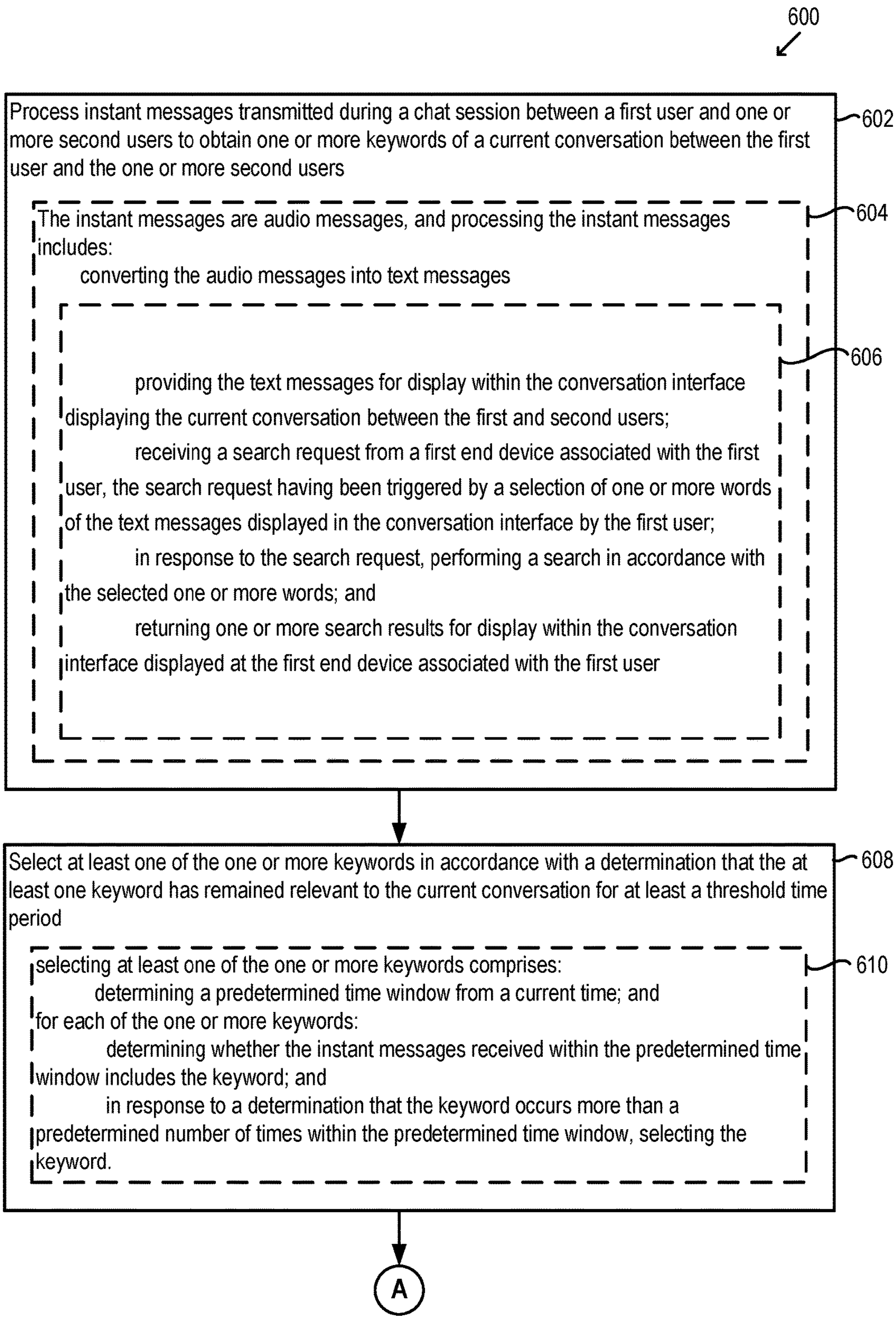
Figure 6B:
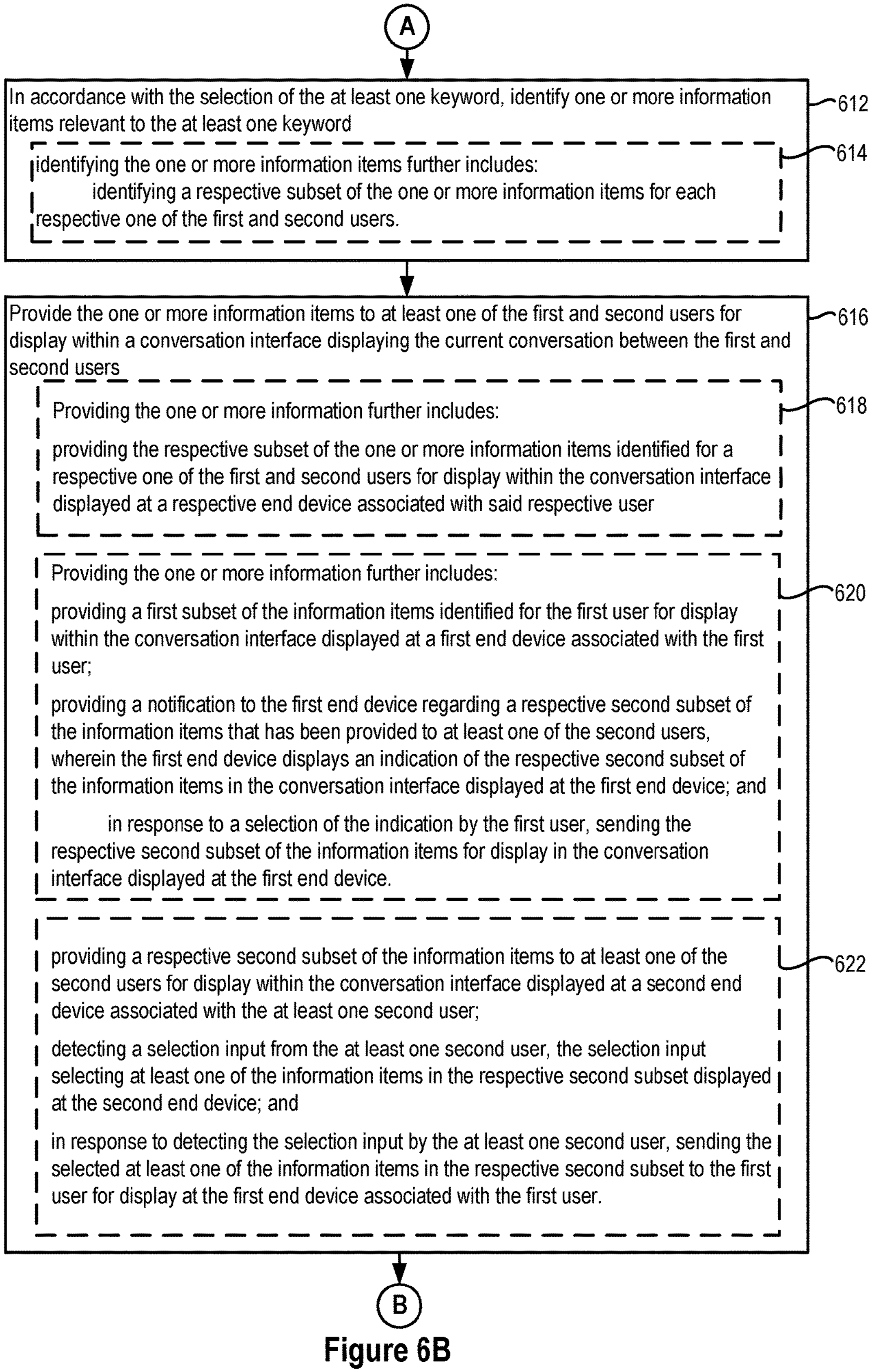

FIGS. 6A-6C illustrate a flowchart diagram of a method 600 of providing recommendations during a chat session via a social networking platform in accordance with some embodiments. In some embodiments, method 600 is performed by a server system 108 with one or more processors and memory. For example, in some embodiments, method 600 is performed by server system 108 (FIGS. 1-2) or a component thereof (e.g., server-side module 106, FIGS. 1-2). In some embodiments, method 600 is governed by instructions that are stored in a non-transitory computer readable storage medium and the instructions are executed by one or more processors of the server system. Optional operations are indicated by dashed lines (e.g., boxes with dashed-line borders).

The server system 108 processes (602) instant messages transmitted during a chat session between a first user and one or more second users to obtain one or more keywords of a current conversation between the first user and the one or more second users. In some embodiments, the instant messages are audio messages and/or text messages exchanged during the chat session between two or more users who are using respective client devices 104. The instant messages may be complete files or real time streaming files recorded by the client devices 104.

In some embodiments, the server 108 includes a database (e.g., service information database 242, FIG. 2) storing one or more predetermined keywords related to service categories, service provider names, and the corresponding locations of the service providers. For example, the one or more keywords may include service categories such as "restaurant", "theater", "grocery store", "shopping mall", etc. The database may further store keywords, such as "food", "eat", "dinner", "hungry", etc., which are relevant to "restaurant", but may not be the exact word as "restaurant". The database may further include one or more predetermined keywords that are service provider names, such as restaurant names like "Xiaofeiyang", "Haidilao". The database may also include one or more predetermined keywords related to the corresponding location of the service providers, such as "Wudaokou", "Fuxingmen".

In some embodiments, the server system 108 (e.g., the obtaining module 222, FIG. 2) obtains, from the received instant messages, one or more words. The server system 108 (e.g., the searching module 224, FIG. 2) then searches, based the on one or more obtained words, the database 114 for relevant search results. In some embodiments, the one or more words obtained from the instant messages may be the same as one or more keywords stored at the database. In some embodiments, the one or more words obtained from the instant messages are related to one or more keywords stored at the database, but the actual words extracted from the instant messages are different from the related keywords from the database. For example, the keyword is "weather", if the message is "it's so hot today", or "Yeah, I hope it will cool down tomorrow." In another example, the keyword is "restaurants" or "fast food", if the messages are "I am hungry", "I need something fast and cheap."

In some embodiments, when the instant messages are audio messages, the server system 108 converts (604) the instant messages into text messages. The server system may use any suitable voice recognition technology as discussed earlier in the present application. The voice recognition process includes a training stage to collect users' voices by storing feature vectors of the users' voices as templates. The voice recognition process also includes a recognition stage, where the feature vectors of the received audio messages are compared with the templates stored during the training stage to generate the text messages to be displayed on the user's end device 104. In some embodiments, the conversation interface (e.g., the user interface 500 of FIGS. 5A-5I) may first display an audio bubble for each audio message, as shown in FIG. 5H, and the audio bubble may be replaced with a corresponding text message after the user provides a required input on the audio bubble or in the interface.

In some embodiments, the server system 108 provides (606) the converted text messages for displaying within the conversation interface (e.g., the user interface 500 of FIGS. 5A-5I) displaying the current conversation of the chat session between the first and the second user on the respective client devices 104. In some embodiments as shown in FIG. 5G, the user may select one or more words from the text messages on the screen display by long pressing the one or more words as triggering a search request from the end device to the server. The selected one or more words are used as words for searching in the server database. The server system 108 receives (606) a search request from a first end device associated with the first user, for example, the search request includes selecting one or more words by the first user on the first client device. In response to the search request, the server system 108 performs (606) a search in accordance with the selected one or more words. The server system 108 then returns (606) the one or more search results for displaying within the conversation interface (e.g., the user interface 500 of FIGS. 5A-5) displayed at the first end device to the first user. In some embodiments, the conversation interface (e.g., the user interface 500 of FIGS. 5A-5I) is the same interface that is used for displaying the chat messages between the first user and the one or more second users.

The server system 108 selects (608) at least one of the one or more keywords in accordance with a determination that the at least one keyword has remained relevant to the current conversation for at least a threshold time period. In some embodiments, when a keyword has recurred for more than X number of times during the past Y minutes, then this keyword is selected, where X and Y are predetermine values. In some embodiments, the recurring of the keyword may be in different formats, for example, the messages "I am hungry", "when can we eat", "I want to eat now", "you have to get me some food before I faint", may all be counted toward the occurrence of the keyword "restaurant".

In some embodiments, the server system 108 also determines (610) a predetermined time window from a current time, and for each of the one or more keywords obtained from the instant messages, the server system 108 further determines (610) whether the instant messages received within the predetermined time window include the keyword. In response to a determination that the keyword occurs more than a predetermined number of times within the predetermined time window, the server system 108 selects (610) the keyword.

As shown in FIG. 6B, in accordance with the selection of the at least one keyword, the server system 108 identifies (612) one or more information items relevant to the at least one keyword. In some embodiments, the server system 108 (e.g., the searching module 224, FIG. 2) may search the database 114 based on the selected at least one keyword obtained from the instant messages.

In some embodiments, the server system 108 identifies (614) the one or more information items include identifying a respective subset of the one or more information items for each respective one of the first and second users. The respective subsets are associated with respective locations and/or respective keywords associated with the first user and the one or more second users. In some embodiments, the respective subsets of the information items for each of the first and second users may be stored at a database as record entries each including user account, keywords, and record time. In some embodiments, at least two subsets are distinct from each other.

The server system provides (616) the one or more information items to at least one of the first and second users for display within a conversation interface (e.g., the user interface 500 of FIGS. 5A-5I) displaying the current conversation between the first and the second users. For example, the information items identified based on the location and/or keywords associated with the first user are provided to the first end device for displaying within the conversation interface (e.g., the user interface 500 of FIGS. 5A-5I) on the first end device. The information items identified based on the location and/or keywords associated with the second user are provided to the second end device for displaying win the conversation interface (e.g., the user interface 500 of FIGS. 5A-5I) on the second end device. The conversation interface (e.g., the user interface 500 of FIGS. 5A-5I) on the first and second end devices are used for chatting between the first user and the second user, so that the user may view the recommended information items directly on the conversation interface (e.g., the user interface 500 of FIGS. 5A-5I), and no change of interface occurs when the user wishes to see the information items.

In some embodiments, the information items are provided at a triggering event, for example, when the one or more keywords appear for a predetermined number of times during the chat session within a predetermined time. In some embodiments, each of the one or more information items are displayed at the end device in a banner at the top of the screen as shown in FIG. 5C, and in response to a touch on the screen from the first user, the one or more information items are shown on a map at the first end device as shown in Figure 5F. In some embodiments, each of the one or more information items are displayed in scrollbars, as shown in FIGS. 5D-5E. In some embodiments, travel time and/or waiting time for each information items retrieved from server may be further displayed. In some embodiments, after the user makes a selection among the information items on the map, one or more routes may be recommended to the user based on the user's current location.

In some embodiments, the server system 108 provides (618) the respective subset of the one or more information items identified for a respective one of the first and second users for display within the conversation interface (e.g., the user interface 500 of FIGS. 5A-5I) displayed at a respective end device associated with the respective user.

In some embodiments, the server system 108 provides (620) a first subset of the information items identified for the first user for display within the conversation interface (e.g., the user interface 500 of FIGS. 5A-5I) displayed at a first end device associated with the first user. In some embodiments, the server system 108 provides (520) a notification to the first end device regarding a respective second subset of the information items that has been provided to at least one of the second users, wherein the first end device displays an indication of the respective second subset of the information items in the conversation interface displayed at the first end device as shown in example of FIG. 5H. In some embodiments, in response to a selection of the indication by the first user, sending the respective second subset of the information items for display in the conversation interface displayed at the first end device as shown in the example of FIG. 5I. In some embodiments, there are buttons next to the instant messages sent by respective users as shown in FIG. 5H, the first user may press a certain button (e.g, icon 518 of FIG. 5I) to check the information items recommended to the second user on the first end device. In some embodiments, the information items recommended to the second user may be displayed as scrollbar at the top (e.g., FIG. 5I), or displayed on a map.

In some embodiments as shown in FIG. 5I, the server system 108 provides (622) a respective second subset of the information items to at least one of the second users for display within the conversation interface displayed at a second end device associated with the at least one second user. The server system detects (622) a selection input from the at least one second user, the selection input selecting at least one of the information items in the respective second subset displayed at the second end device. In response to detecting the selection input by the at least one second user, the server system 108 sends (622) the selected at least one of the information items in the respective second subset to the first user for display at the first end device associated with the first user. In some embodiments, the second user's selection among the recommendations to the second user may be displayed as a top banner (e.g., FIG. 5I), an instant message, or further displayed on map upon the first user's touch on the screen.

In some embodiments as shown in FIG. 6C, the server system 108 identifies (624) respective locations relevant to the first user and the one or more second users. In some embodiments, the locations may be identified using GPS, or mobile operation network, or any suitable technology. In some embodiments, the one or more information items are identified (626) to be located within a predetermined range of a respective identified location.

In some embodiments, the server system 108 also determines (628) whether the selected at least one keyword has ceased to be relevant to the current conversation in accordance with predetermined relevance criteria. The server system 108 further notifies (628) a respective end device associated with the at least one of the first and second users to cease displaying the one or more information items within the conversation interface.

In some embodiments, the server system 108 determines (630) whether the selected at least one keyword has ceased to be relevant to the current conversation in accordance with predetermined relevance criteria further comprises: determining a predetermined time window from a current time; and for each of the selected at least one keyword: determining whether a frequency number of the keyword in instant messages received within the predetermined time window is smaller than a predetermined frequency threshold; and in response to a determination that the frequency number is smaller than the predetermined frequency threshold, determining that the keyword has ceased to be relevant to the current conversation between the first user and the one or more second users.

In some examples, when the server 108 determines that the current conversation is no longer related to restaurants or eating (e.g., no mention of the related keywords in the past M messages or N minutes, M and N are predetermine values), the server sends a notification to a user's respective end device displaying the recommendations for restaurants near the user to stop displaying the recommendations. This helps to keep the interface clean and free of unnecessary clutter.

In some embodiments, the criteria for determining that a keyword is no longer relevant to the current conversation is that the keyword has not occurred for more than a threshold number of times during a predetermined past time window. e.g., if the keyword has not recurred for X number of times during the past Y minutes. This may indicate the users have moved on from the topic related to the keyword, then the recommendations based on this keyword are removed from the user interface of the chat program.

It should be noted that, in the foregoing processes and structural diagrams, not all the steps and modules are necessary, and some steps or modules may be ignored according to actual needs. An execution sequence of steps is not fixed, and may be adjusted as required. Division of modules is merely functional division for ease of description; in an actual implementation, one module may be implemented by multiple modules, and functions of multiple modules may also be implemented by a same module; and these modules may be located in a same device, and may also be located in different devices.

Hardware modules in the embodiments may be implemented in a mechanical or electronic manner. For example, one hardware module may include a specially designed permanent circuit or logical device (for example, a dedicated processor, such as an FPGA or an ASIC), and is used for perform specific operations. The hardware module may also include a programmable logic device or a circuit temporarily configured by software (for example, including a general processor or other programmable processors), and is used for performing specific operations. Whether the hardware module is implemented by using a mechanical manner, or by using a dedicated permanent circuit, or by using a temporarily configured circuit (for example, configured by software) may be determined according to costs and time.

The present disclosure further provides a machine readable storage medium, which stores an instruction enabling a machine to execute the method described in the specification. Specifically, a system or an apparatus equipped with the storage medium may be provided, software program code for implementing a function of any embodiment in the foregoing embodiments is stored in the storage medium, and a computer (or a CPU or an MPU) of the system or the apparatus is enabled to read and execute the program code stored in the storage medium. In addition, an operating system operated in a computer may further be enabled, according to the instructions based on the program code, to perform a part of or all of actual operations. The program code read from the storage medium may further be written in a memory disposed in an expansion board inserted in the computer or may be written in a memory disposed in an expansion unit connected to the computer, and then the CPU disposed on the expansion board or the expansion unit is enabled, based on the instruction of the program code, to perform a part of or all of the actual operations, so as to implement the functions of any embodiment in the foregoing embodiments.

An embodiment of the storage medium used for providing the program code includes a floppy disk, a hard disk, a magneto-optical disk, an optical disc (such as a CD-ROM, a CD-R, a CD-RW, a DVD-ROM, a DVD-RAM, a DVD-RW, and a DVD+RW), a magnetic tape, a nonvolatile memory card and a ROM. Optionally, a communications network may be used for downloading the program code from a server computer.

The foregoing descriptions are merely preferred embodiments of the present application, which are not used for limiting the protection scope of the present application. Any modification, equivalent replacement, and improvement made without departing from the spirit and principle of the present application shall fall within the protection scope of the present application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the application to the precise forms disclosed. Many modifications and variations are possible in view of the above teachings. The embodiments were chosen and described in order to best explain the principles of the application and its practical applications, to thereby enable others skilled in the art to best utilize the application and various embodiments with various modifications as are suited to the particular use contemplated.

What is claimed is:

1. A method for providing recommendations of service providers, comprising:

at a server system having one or more processors and a memory:

processing instant messages transmitted during a chat session between a first user and at least a second user to obtain one or more keywords of a current conversation between the first user and at least the second user;

selecting at least one of the one or more keywords in accordance with a determination that the at least one keyword has remained relevant to the current conversation for at least a threshold time period;

in accordance with the selection of the at least one keyword:

determining respective geographic locations corresponding to the first user and the second user; and identifying one or more service providers that are relevant to the at least one keyword, including a first subset of service providers that are located in proximity to a first geographic location corresponding to the first user and a second subset of service providers that are located in proximity to a second geographic location corresponding to the second user, the first subset of service providers being different from the second subset of service providers; and providing the one or more service providers to the first and second users for display within a conversation interface displayed at respective end devices associated with the first and second users, the conversation interface displaying the current conversation between the first and second users during the chat session, wherein providing the one or more service provides to the first and second users includes:

providing the first subset of service providers that are located in proximity to the first geographic location corresponding to the first user for display within the conversation interface displayed at a first end device associated with the first user;

providing the second subset of service providers that are located in proximity to the second geographic location corresponding to the second user for display within the conversation interface displayed at a second end device associated with the second user;

providing a notification to the first end device regarding the provision of the second subset of the service providers to the second end device associated with the second user, wherein the notification causes the first device to display an indicator adjacent to an instant message received from the second user in the conversation interface displayed at the first end device; and in response to a user selection of the indicator in the conversation interface displayed at the first end device, providing the respective second subset of the service providers for display in the conversation interface displayed at the first end device.

2. The method of claim 1, wherein the instant messages are audio messages, and processing the instant messages includes converting the audio messages into text messages.

3. The method of claim 2, further comprising:

providing the text messages for display within the conversation interface displaying the current conversation between the first and second users;

receiving a search request from the first end device associated with the first user, the search request having been triggered by a selection of one or more words of the text messages displayed in the conversation interface by the first user;

in response to the search request, performing a search in accordance with the selected one or more words; and returning one or more search results for display within the conversation interface displayed at the first end device associated with the first user.

4. The method of claim 1, further comprising:

receiving a selection input from the second user detected on the conversation interface displayed at the second end device, the selection input selecting at least one of the service providers in the second subset of service providers displayed at the second end device; and in response to detecting the selection input by the second user, sending the selected at least one of the service providers in the second subset to the first user for display at the first end device associated with the first user.

5. The method of claim 1, wherein selecting at least one of the one or more keywords in accordance with a determination that the at least one keyword has remained relevant to the current conversation for at least a threshold time period further comprises:

determining a predetermined time window from a current time; and for each of the one or more keywords:

determining whether the instant messages received within the predetermined time window includes the keyword; and in response to a determination that the keyword occurs more than a predetermined number of times within the predetermined time window, selecting the keyword.

6. The method of claim 1, further comprising:

determining whether the selected at least one keyword has ceased to be relevant to the current conversation in accordance with predetermined relevance criteria; and notifying a respective end device associated with the at least one of the first and second users to cease displaying the one or more information items within the conversation interface.

7. The method of claim 6, wherein determining whether the selected at least one keyword has ceased to be relevant to the current conversation in accordance with predetermined relevance criteria further comprises:

determining a predetermined time window from a current time; and for each of the selected at least one keyword:

determining whether a frequency number of the keyword in instant messages received within the predetermined time window is smaller than a predetermined frequency threshold; and in response to a determination that the frequency number is smaller than the predetermined frequency threshold, determining that the keyword has ceased to be relevant to the current conversation between the first user and at least the second user.

8. A server system, comprising:

one or more processors; and memory storing one or more programs to be executed by the one or more processors, the one or more programs comprising instructions for:

processing instant messages transmitted during a chat session between a first user and at least a second user to obtain one or more keywords of a current conversation between the first user and at least the second user;

selecting at least one of the one or more keywords in accordance with a determination that the at least one keyword has remained relevant to the current conversation for at least a threshold time period;

in accordance with the selection of the at least one keyword:

determining respective geographic locations corresponding to the first user and the second user; and identifying one or more service providers that are relevant to the at least one keyword, including a first subset of service providers that are located in proximity to a first geographic location corresponding to the first user and a second subset of service providers that are located in proximity to a second geographic location corresponding to the second user, the first subset of service providers being different from the second subset of service providers; and providing the one or more service providers to the first and second users for display within a conversation interface displayed at respective end devices associated with the first and second users, the conversation interface displaying the current conversation between the first and second users during the chat session, wherein providing the one or more service provides to the first and second users includes:

providing the first subset of service providers that are located in proximity to the first geographic location corresponding to the first user for display within the conversation interface displayed at a first end device associated with the first user;

providing the second subset of service providers that are located in proximity to the second geographic location corresponding to the second user for display within the conversation interface displayed at a second end device associated with the second user;

providing a notification to the first end device regarding the provision of the second subset of the service providers to the second end device associated with the second user, wherein the notification causes the first device to display an indicator adjacent to an instant message received from the second user in the conversation interface displayed at the first end device; and in response to a user selection of the indicator in the conversation interface displayed at the first end device, providing the respective second subset of the service providers for display in the conversation interface displayed at the first end device.

9. The server system of claim 8, wherein selecting at least one of the one or more keywords in accordance with a determination that the at least one keyword has remained relevant to the current conversation for at least a threshold time period further comprises:

determining a predetermined time window from a current time; and for each of the one or more keywords:

determining whether the instant messages received within the predetermined time window includes the keyword; and selecting the keyword in response to a determination that the keyword occurs more than a predetermined number of times within the predetermined time window.

10. The server system of claim 8, wherein the instant messages are audio messages, and processing the instant messages includes converting the audio messages into text messages.

11. The server system of claim 8, wherein the one or more programs further comprise instructions for:

providing the text messages for display within the conversation interface displaying the current conversation between the first and second users;

receiving a search request from the first end device associated with the first user, the search request having been triggered by a selection of one or more words of the text messages displayed in the conversation interface by the first user;

in response to the search request, performing a search in accordance with the selected one or more words; and returning one or more search results for display within the conversation interface displayed at the first end device associated with the first user.

12. The server system of claim 8, wherein the one or more programs further comprise instructions for:

receiving a selection input from the second user detected on the conversation interface displayed at the second end device, the selection input selecting at least one of the service providers in the second subset of service providers displayed at the second end device; and in response to detecting the selection input by the second user, sending the selected at least one of the service providers in the second subset to the first user for display at the first end device associated with the first user.

13. The server system of claim 8, wherein the one or more programs further comprise instructions for:

determining whether the selected at least one keyword has ceased to be relevant to the current conversation in accordance with predetermined relevance criteria; and notifying a respective end device associated with the at least one of the first and second users to cease displaying the one or more information items within the conversation interface.

14. The server system of claim 13, wherein determining whether the selected at least one keyword has ceased to be relevant to the current conversation in accordance with predetermined relevance criteria further comprises:

determining a predetermined time window from a current time; and for each of the selected at least one keyword:

determining whether a frequency number of the keyword in instant messages received within the predetermined time window is smaller than a predetermined frequency threshold; and in response to a determination that the frequency number is smaller than the predetermined frequency threshold, determining that the keyword has ceased to be relevant to the current conversation between the first user and at least the second user.

15. A non-transitory computer readable storage medium storing one or more programs, the one or more programs comprising instructions, which, when executed by a server system with one or more processors, cause the server system to perform operations comprising:

processing instant messages transmitted during a chat session between a first user and at least a second user to obtain one or more keywords of a current conversation between the first user and at least the second user;

selecting at least one of the one or more keywords in accordance with a determination that the at least one keyword has remained relevant to the current conversation for at least a threshold time period;

in accordance with the selection of the at least one keyword:

determining respective geographic locations corresponding to the first user and the second user;

identifying one or more service providers that are relevant to the at least one keyword, including a first subset of service providers that are located in proximity to a first geographic location corresponding to the first user and a second subset of service providers that are located in proximity to a second geographic location corresponding to the second user, the first subset of service providers being different from the second subset of service providers; and providing the one or more service providers to the first and second users for display within a conversation interface displayed at respective end devices associated with the first and second users, the conversation interface displaying the current conversation between the first and second users during the chat session, wherein providing the one or more service provides to the first and second users includes:

providing the first subset of service providers that are located in proximity to the first geographic location corresponding to the first user for display within the conversation interface displayed at a first end device associated with the first user;

providing the second subset of service providers that are located in proximity to the second geographic location corresponding to the second user for display within the conversation interface displayed at a second end device associated with the second user;

providing a notification to the first end device regarding the provision of the second subset of the service providers to the second end device associated with the second user, wherein the notification causes the first device to display an indicator adjacent to an instant message received from the second user in the conversation interface displayed at the first end device; and in response to a user selection of the indicator in the conversation interface displayed at the first end device, providing the respective second subset of the service providers for display in the conversation interface displayed at the first end device.

16. The non-transitory computer readable storage medium of claim 15, wherein selecting at least one of the one or more keywords in accordance with a determination that the at least one keyword has remained relevant to the current conversation for at least a threshold time period further comprises:

determining a predetermined time window from a current time; and for each of the one or more keywords:

determining whether the instant messages received within the predetermined time window includes the keyword; and selecting the keyword in response to a determination that the keyword occurs more than a predetermined number of times within the predetermined time window.

17. The non-transitory computer readable storage medium of claim 15, wherein:

the instant messages are audio messages, processing the instant messages includes converting the audio messages into text messages; and the one or more programs further comprise instructions for:

providing the text messages for display within the conversation interface displaying the current conversation between the first and second users;

receiving a search request from the first end device associated with the first user, the search request having been triggered by a selection of one or more words of the text messages displayed in the conversation interface by the first user;

in response to the search request, performing a search in accordance with the selected one or more words; and returning one or more search results for display within the conversation interface displayed at the first end device associated with the first user.

18. The non-transitory computer readable storage medium of claim 15, wherein the one or more programs further comprise instructions for:

receiving a selection input from the second user detected on the conversation interface displayed at the second end device, the selection input selecting at least one of the service providers in the second subset of service providers displayed at the second end device; and in response to detecting the selection input by the second user, sending the selected at least one of the service providers in the second subset to the first user for display at the first end device associated with the first user.

19. The non-transitory computer readable storage medium of claim 15, wherein the one or more programs further comprise instructions for:

determining whether the selected at least one keyword has ceased to be relevant to the current conversation in accordance with predetermined relevance criteria; and notifying a respective end device associated with the at least one of the first and second users to cease displaying the one or more information items within the conversation interface.

20. The non-transitory computer readable storage medium of claim 19, wherein determining whether the selected at least one keyword has ceased to be relevant to the current conversation in accordance with predetermined relevance criteria further comprises:

determining a predetermined time window from a current time; and for each of the selected at least one keyword:

determining whether a frequency number of the keyword in instant messages received within the predetermined time window is smaller than a predetermined frequency threshold; and in response to a determination that the frequency number is smaller than the predetermined frequency threshold, determining that the keyword has ceased to be relevant to the current conversation between the first user and at least the second user.

* * * * *